(No Model.)

D. RHODES.
NUT LOCK.

No. 530,963. Patented Dec. 18, 1894.

Inventor
Daniel Rhodes,
By his Attorneys.
C. A. Snow & Co.

Witnesses
Julius Ulke Jr.
H. J. Riley

THE NORRIS PETERS CO., PHOTO-LITHO., WASHINGTON, D. C.

UNITED STATES PATENT OFFICE.

DANIEL RHODES, OF WASHINGTON, DISTRICT OF COLUMBIA.

NUT-LOCK.

SPECIFICATION forming part of Letters Patent No. 530,963, dated December 18, 1894.

Application filed February 16, 1894. Serial No. 500,395. (No model.)

*To all whom it may concern:*

Be it known that I, DANIEL RHODES, a citizen of the United States, residing at Washington, in the District of Columbia, have invented a new and useful Nut-Lock, of which the following is a specification.

The invention relates to improvements in nut locks.

The object of the present invention is to improve the construction of nut locks, and to provide a simple and inexpensive one, by which a nut will be effectually prevented from incidentally or automatically unscrewing, and which will permit the nut to be readily removed when desired.

The invention consists in the construction and novel combination and arrangement of parts hereinafter fully described, illustrated in the accompanying drawings and pointed out in the claim hereto appended.

Figure 1:
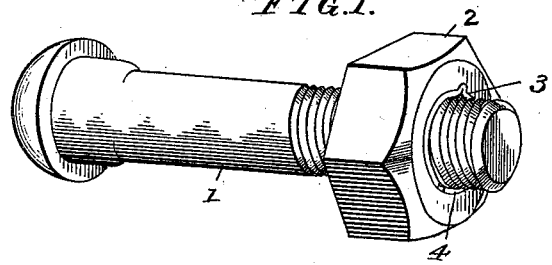
Figure 2:
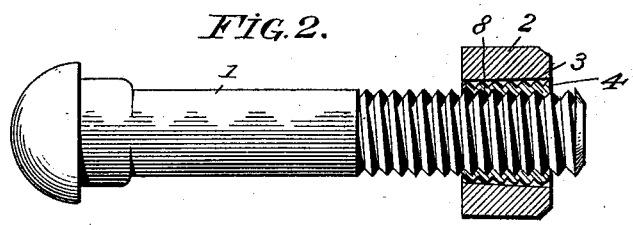
Figure 3:
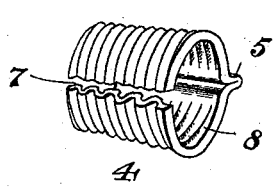
Figure 4:
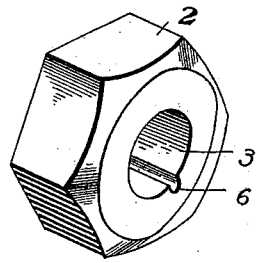
Figure 5:
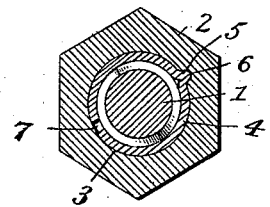

In the drawings—Figure 1 is a perspective view of a nut lock constructed in accordance with this invention. Fig. 2 is a longitudinal sectional view. Fig. 3 is a detail perspective view of the tapering resilient sleeve. Fig. 4 is a similar view of the nut. Fig. 5 is a transverse sectional view of the nut lock.

Like numerals of reference indicate corresponding parts in all the figures of the drawings.

1 designates a bolt of the usual construction having arranged on its threaded end a nut 2, which is provided with a slightly tapering threadless opening 3 receiving a tapering sleeve 4. The tapering opening 3 of the nut gradually decreases in diameter from the outer face of the nut. The sleeve has substantially a cylindrical inner surface, and is also provided with a tapering outer surface which gradually decreases in diameter from its outer end, whereby the automatic tendency of the nut to move outward on the sleeve will compress the latter and cause it to clamp the bolt until the nut becomes immovable; that is, as the sleeve and nut working together are rotated against the fish plate or other barrier, the frictional contact of the nut prevents it from moving inward, though it continues by its revolution to feed the sleeve inward until the sleeve becomes clamped around the bolt by the wedging action of the sleeve within the nut. Thus, not only is the sleeve clamped on the bolt, but the nut itself is held from longitudinal movement.

The sleeve is provided with interior threads to engage those of the bolt. It is provided at one side with a longitudinal rib 5 which fits in a corresponding groove 6 of the nut; and the ends of the metal of which the sleeve is constructed are separated at 7, to impart resiliency to the sleeve.

In constructing the sleeve, a strip of sheet metal tapering in thickness from one side edge to the other, is employed, and this is cut into pieces of suitable length for forming a sleeve. The latter is shaped by suitable dies, which form the interior threads 8, and the longitudinal rib 5; and incident to the formation in this manner of the interior threads 8, are the exterior corrugations. The sleeve may be constructed of sheet metal of equal thickness, and be afterward shaped by suitable formers or dies to produce the necessary tapering; but it is preferable to employ in the formation of the sleeves, metallic strips tapering in thickness.

The nut, after being screwed on the bolt, may be readily removed when desired by moving it inward slightly, to loosen the sleeve; and this may be accomplished by any suitable means, such as employing a jam nut. When a jam nut is used, and the nut 2 is forced inward slightly to release the sleeve, both nuts may be readily screwed off the bolt together without liability of causing the resilient sleeve to clamp the bolt.

It will be seen that the nut lock is positive and reliable in its operation, that it is economic in construction, as it employs an ordinary construction of nut; while the cost of the nut is lessened by dispensing with the threading thereof. It will also be seen that the sleeve is of very economic construction, as it may be readily made from sheet metal.

Changes in the form, proportion, and the minor details of construction may be resorted to without departing from the principle or sacrificing any of the advantages of this invention.

What I claim is—

In a nut lock, the combination with a bolt, of a threadless nut provided with a groove, and a resilient sleeve arranged within the nut, and constructed of a strip of sheet metal tapering in width and provided with an exterior longitudinal rib formed by folding the sheet metal and with interior stamped threads, and having the ends of the strip separated, whereby it is made resilient, substantially as described.

In testimony that I claim the foregoing as my own I have hereto affixed my signature in the presence of two witnesses.

DANIEL RHODES.

Witnesses:
JOHN H. SIGGERS,
E. G. SIGGERS.